(12) United States Patent
Chen (10) Patent No.: US 8,136,796 B2
(45) Date of Patent: Mar. 20, 2012

(54) CARBURETOR WITH A STARTER

(76) Inventor: QiAn Chen, Ruian (CN)

( * ) Notice: Subject to any disclaimer, the term of this patent is extended or adjusted under 35 U.S.C. 154(b) by 449 days.

(21) Appl. No.: 12/486,765

(22) Filed: Jun. 18, 2009

(65) Prior Publication Data

US 2010/0308479 A1 Dec. 9, 2010

(30) Foreign Application Priority Data

Jun. 3, 2009 (CN) ...................... 2009 2 0057762 U (51) Int. Cl.
*F02M 1/02* (2006.01)
(52) U.S. Cl. .................... 261/50.1; 261/59; 261/64.6
(58) Field of Classification Search .................. 261/50.1, 261/52, 59, 64.1, 64.6, 66, 71
See application file for complete search history.

(56) References Cited

U.S. PATENT DOCUMENTS

| 3,640,512 | A | * | 2/1972 | Morgenroth | 261/34.2 |
|---|---|---|---|---|---|
| 3,823,700 | A | * | 7/1974 | Gumtow | 123/395 |
| 3,837,322 | A | * | 9/1974 | Shishido et al. | 123/274 |
| 3,928,511 | A | * | 12/1975 | Atsumi et al. | 261/64.4 |
| 4,094,288 | A | * | 6/1978 | Davis | 123/442 |
| 4,530,805 | A | * | 7/1985 | Abbey | 261/53 |
| 4,670,194 | A | * | 6/1987 | Buford et al. | 261/36.2 |
| 4,946,631 | A | * | 8/1990 | Buford | 261/39.5 |
| 4,983,330 | A | * | 1/1991 | Harbeke | 261/52 |
| 5,611,312 | A | * | 3/1997 | Swanson et al. | 123/436 |
| 6,000,683 | A | * | 12/1999 | Van Allen | 261/52 |
| 6,202,989 | B1 | * | 3/2001 | Pattullo | 261/52 |
| 6,439,547 | B1 | * | 8/2002 | King et al. | 261/52 |
| 2002/0163088 | A1 | * | 11/2002 | Gliniecki et al. | 261/65 |
| 2003/0164558 | A1 | * | 9/2003 | Kojima et al. | 261/64.6 |

FOREIGN PATENT DOCUMENTS

GB 2116259 A * 9/1983 .................. 261/64.6

* cited by examiner

*Primary Examiner* — Richard L Chiesa (57) ABSTRACT

A carburetor with a starter includes a carburetor body, a main fuel supply device with a swing frame, an idle speed fuel supply device with a main metering pin, a starter, a joint for a fuel input pipe and a main nozzle having a fuel nozzle. The carburetor further includes an operating mechanism having a linkage arm and an air strangler. The air strangler and the linkage arm are pivoted to two sides of the carburetor body, respectively. The linkage arm has an upper position and a lower position formed thereon. The upper position presses against the swing frame so as to move the main metering pin and cause the air strangler to shut down an air passage in the carburetor body.

8 Claims, 12 Drawing Sheets

CARBURETOR WITH A STARTER

FIELD OF THE INVENTION

The present invention relates to a carburetor, and more particularly to a carburetor with a starter which can improve the starting performance of an engine.

BACKGROUND OF THE INVENTION

With the improvement of the society and the development of the economic, the general gasoline engine industry is provided with a good development platform. And the booming general gasoline engine industry further accelerates the development of its accessorial industries, one of which is the carburetor industry.

A carburetor is a equipment that mixes a certain amount of fuel and some air to keep the engine working normally, so as to prevent the engine from stopping work or damage under a "lacking fuel" condition, which is caused by that no sufficient fuel can be mixed with the air, and in turn, make the engine works more reliably and safely, decrease malfunction of the engine, improve the average life without malfunction of the engines, and save time for people. Meanwhile, the carburetor monitors whether superfluous fuel is mixed with the air so as to insure the proportion of the mixed fuel and air and, in turn, prevent the engine from working under a "rich fuel" condition, which may cause the engine to stop working, generate a lot of smoke, work in bad condition or waste fuel. Thus, the carburetor works as a heart of an engine, and the performance of the carburetor plays an important role in the engine's performance. Therefore, choosing a good carburetor is one of key factors to maintain the engine and bring the engine into full play.

During the course of starting the engine, there is a need to increase the caliber of the carburetor's output port and increase the fuel output. And at the same time, it is also needed to close the air passage of the carburetor to make the engine have a high density fuel so as to increase the probability of the successful start of the engine. However, the carburetors on the market generally have the following drawbacks.

At present, before a carburetor leaves the factory, a metering pin, used for controlling the amount of the fuel supplied by the main fuel supply device and the idle speed fuel supply device, is adjusted according to the technique state matched with the engine, such that the air and the fuel can be mixed in an optimal proportion to bring the engine into fill play when the carburetor supplies fuel to the engine, finally saving the energy. Nonetheless, in order to increase the probability of the successful start of the engine and decrease the times of starting the engine, the carburetor should work with the fuel and the air having a high mixing proportion. Accordingly, after a successful start, the carburetor is required to work normally under a best mixing condition so as to bring the engine into full play and extend the operating life of the engine. However, the prior carburetors can not achieve above-mentioned requirements.

Hence, there is a need to provide an improved carburetor with a starter, which is capable of increasing the mixing proportion of the fuel and the air to increase the probability of the successful start of the engine, and accurately keeping the optimal mixing proportion of the fuel and the air after the successful start, such that the engine can be brought into full play and the useful life of the engine can be prolonged.

SUMMARY OF THE INVENTION

Accordingly, an object of the present invention is to provide a carburetor with a starter, which is capable of increasing the mixing proportion of the fuel and the air to increase the probability of the successful start of the engine, and accurately keeping the optimal mixing proportion of the fuel and the air after the successful start, such that the engine can be brought into full play and the useful life of the engine can be prolonged.

To achieve the above-mentioned object, the present invention provides a carburetor with a starter comprising a carburetor body, a main fuel supply device with a swing frame, an idle speed fuel supply device with a main metering pin, a starter, a joint for a fuel input pipe and a main nozzle having a fuel nozzle. The idle speed fuel supply device is mounted on the main fuel supply device and connected with the main nozzle to constitute a fuel injector. The main fuel supply device, the joint for a fuel input pipe and the main nozzle are respectively mounted on the carburetor body. Moreover, the carburetor further comprises an operating mechanism having a linkage arm and an air strangler. The air strangler is pivoted to one side of the carburetor body, and the linkage arm is pivoted to the other side of the carburetor body. The linkage arm has an upper position and a lower position. When the upper position presses against the swing frame, the main metering pin is moved and the air strangler closes an air passage in the carburetor body.

As an exemplary embodiment of the present invention, the main metering pin has a rolling male thread, and a main metering pin cover of the idle speed fuel supply device has a rolling female thread formed therein engaged with the rolling male thread. Concretely, a main metering pin pressure spring is disposed between the main metering pin and the main metering pin cover, with one end thereof pressed against the main metering pin and the other end pressed against the main metering pin cover The main metering pin can move up and down along the main metering pin cover more accurately and reliably due to the cooperation of the rolling male thread and rolling female thread. And the main metering pin pressure spring provides a force to cause the main metering pin to automatic reset.

Preferably, the operating mechanism further includes an air strangler pivot, a spring element, a handle, and a rocker. The air strangler pivot runs through the carburetor body, one end of which is fixed with the air strangler and the other end of which is fixed with the rocker and the linkage arm. The handle is fixed on the air strangler pivot and located between the linkage arm and the air strangler. The spring element is sleeved on the air strangler pivot with its two ends respectively pressed against the carburetor body and the linkage arm. Concretely, the handle has a handle lug formed thereon, and the rocker has a rocker protrusion formed thereon, while the carburetor body has a carburetor body lug and a carburetor body protrusion respectively corresponding to the handle lug and the rocker protrusion formed thereon. The operator may operate the carburetor of the present invention conveniently through the handle. The air strangler pivot makes the air strangler, the rocker and the linkage mounted thereon to move in phase and reliably. The operator just can change the mixing proportion of the fuel and the air in the carburetor in a single direction due to the engagement of the carburetor body lug, the carburetor body protrusion, the rocker protrusion and the handle lug, such that the mixing proportion of the fuel and the air in the carburetor can achieve an optimal state to bring the engine into full play after the engine is started, and the useful life of the engine can be prolonged.

The air strangler further has a blowhole formed therein corresponding to the air passage of the carburetor body. The blowhole keeps the air passage of the carburetor body communicating with the outer air after the air strangler is closed so as to maintain the high proportion of the fuel and the air when the engine is working and enable the engine to have a good starting performance.

Preferably, an arc recess is formed at the upper position of the linkage arm, and the swing frame has a column corresponding to the arc recess formed thereon. When being rotated to a position that the upper position engages with the column, the linkage arm can be held through the cooperation of the column of the swing frame and the arc recess at the upper position of the linkage arm, which can prevent the handle from repositioning due to the spring element, with no outer force transformed thereto such that the engine can keep a high mixing proportion of the fuel and the air when being started.

In comparison with the prior art, the carburetor of the present invention makes use of the linkage arm with the upper position and the lower position, and the air strangler so as to enable the metering pin of the idle speed fuel supply device provided on the main fuel supply device moving up and down in the idle speed fuel supply device to change the fuel output of the fuel nozzle and enable the air passage of the carburetor body being closed, which can increase the mixing proportion of the fuel and the air and, in turn, increase the probability of the successful start of the engine, and keep the optimal mixing proportion of the fuel and the air matching with the technique of the engine after the successful start, such that the engine can be brought into full play. In addition, this structure not only avoids using a screwdriver to adjust the mix proportion of the fuel and the air after a successful start, but also avoids decreasing the performance of the engine and wasting fuel caused by that the optimal mixing proportion of the fuel and the air in the carburetor can not return accurately, which may shorten the useful life of the engine.

The foregoing description of the present invention is only a summarization of the technical solution of the present invention. In order to make the technical solution of this invention more apparent and make it be able to be implemented according to the specification, and in order to make the aforementioned and other objects, features and advantages of the present invention more understandable, a preferred embodiment of the invention with reference to the drawings is selected to illustrate principles of the present invention detailed below.

DETAILED DESCRIPTION OF ILLUSTRATED EMBODIMENTS

In order to expatiate the technical solution to achieve the objects of the present invention further, an explanatory embodiment of the present invention and its features and advantages will now be described with reference to the figures, wherein like reference numerals designate similar parts throughout the various views.

Figure 5:
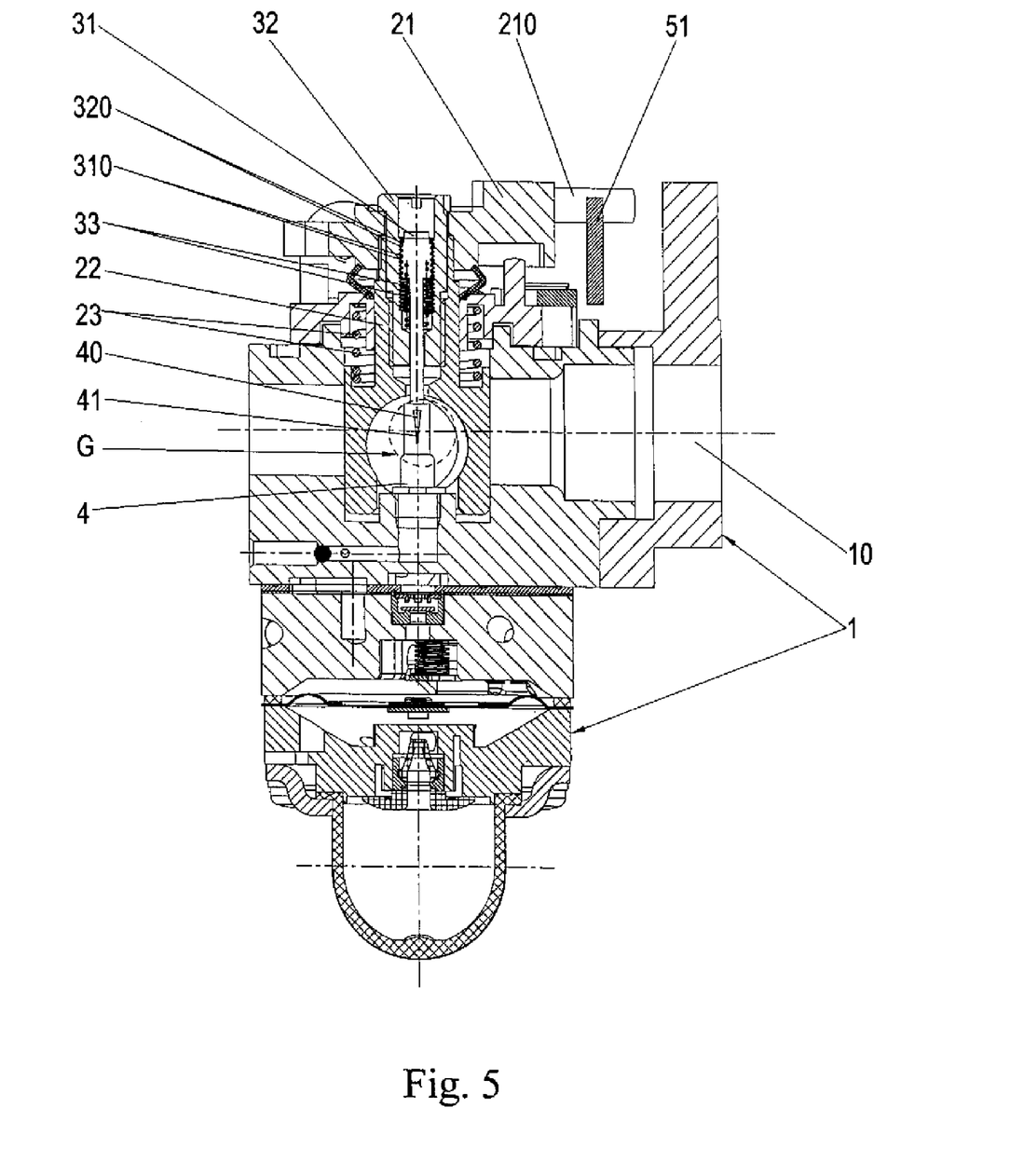
FIG. 5 is a sectional view of the carburetor taken along Line A-A in FIG. 4.
Figure 11:
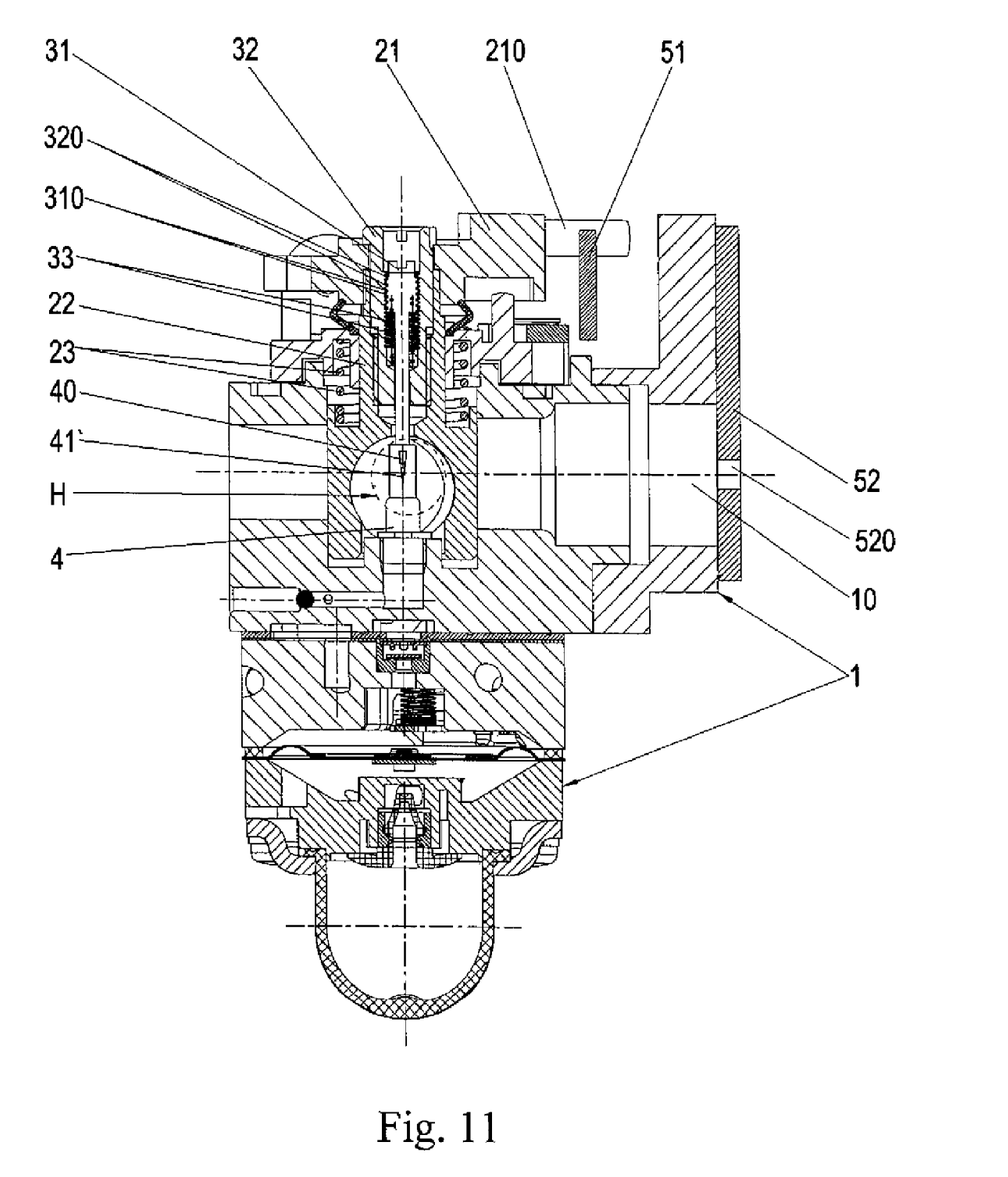
FIG. 11 is a sectional view of the carburetor taken along Line B-B in FIG. 10.

Referring to FIGS. 1-4 and FIGS. 7-10, a carburetor with a starter as an embodiment of the present invention includes a carburetor body 1, a main fuel supply device 2 having a swing frame 21, an idle speed fuel supply device 3 with a main metering pin 31, a starter, a joint for a fuel input pipe and a main nozzle 4 having a fuel nozzle 40, as shown in FIG. 5 and FIG. 11. The idle speed fuel supply device 3 is mounted on the main fuel supply device 2 and connected with the main nozzle 4 so as to constitute a fuel injector, denoted by 41 in FIG. 5 or 41' in FIG. 11. The main fuel supply device 2, the joint for a fuel input pipe and the main nozzle 4 are respectively mounted on the carburetor body 1. Further, the carburetor of the present embodiment includes an operating mechanism 5 having a linkage arm 51 and an air strangler 52. The air strangler 52 is pivoted to one side of the carburetor body 1, and the linkage arm 51 is pivoted to the other side of the carburetor body 1. The linkage arm 51 has an upper position 510 and a lower position 520. When the upper position 510 of the linkage arm 51 presses against the swing frame 21, the main metering pin 31 is moved up and down and the air strangler 52 closes the air passage 10 in the carburetor body 1. In conjunction with FIG. 5 and FIG. 11, more detailed descriptions will be given as follow.

Preferably, the main metering pin 31 has a rolling male thread 310 formed thereon, and a main metering pin cover 32 of the idle speed fuel supply device 3 has a rolling female thread 320 formed therein. Concretely, the main metering pin cover 32 is fixed to a plunger 22 of the main fuel supply device 3. The plunger 22 pivots to the carburetor body 1. A plunger torsion spring 23 sleeves on the plunger 22 with one end pressed against the plunger 22 and the other end pressed against the carburetor body 1. This structure makes the plunger 22, driven by the swing frame 21, to pivot around the axis thereof and automatic reposition when there is no force transformed from the swing frame 21. Moreover, a main metering pin pressure spring 33 is disposed between the main metering pin 31 and the main metering pin cover 32. One end of the main metering pin pressure spring 33 presses against the main metering pin 31 and the other end presses against the main metering pin cover 32. The main metering pin 31 can move up and down along the main metering pin cover 32 more accurately and reliably due to the cooperation of the rolling male thread 310 and rolling female thread 320. And the main metering pin pressure spring 33 provides a force to cause the main metering pin 31 to automatic reset.

Preferably, the operating mechanism 5 further includes an air strangler pivot 53, a spring element 54, a handle 55, and a rocker 56. The spring element 54 may be a torsion spring, but not limited thereto. The air strangler pivot 53 runs through the carburetor body 1, one end of which is fixed with the air strangler 52 and the other end of which is fixed with the rocker 56 and the linkage arm 51. The handle 55 is fixed on the air strangler pivot 53 and located between the linkage arm 51 and the air strangler 52. The spring element 54 is sleeved on the air strangler pivot 53 with its two ends respectively pressed against the carburetor body 1 and the linkage ann 51. Concretely, the handle 55 has a handle lug 551 formed thereon, and the rocker 56 has a rocker protrusion 561 formed thereon, while the carburetor body 1 has a carburetor body lug 11 and a carburetor body protrusion 12 respectively corresponding to the handle lug 551 and the rocker protrusion 561 formed thereon. The operator may operate the carburetor of the present invention conveniently through the handle 55. The air strangler pivot 53 makes the air strangler 52, the rocker 56 and the linkage 51 mounted thereon to move in phase and reliably. The operator just can change the mixing proportion of the fuel and the air in the carburetor in a single direction due to the engagements of the carburetor body lug 11, the carburetor body protrusion 12, the rocker protrusion 561 and the handle lug 55, such that the mixing proportion of the fuel and the air in the carburetor can achieve an optimal proportion accurately to bring the engine into full play after the engine is started, and the useful life of the engine can be prolonged.

The air strangler 52 further has a blowhole 520 formed therein, corresponding to the air passage 10 of the carburetor body 1. The blowhole 520 keeps the air passage 10 of the carburetor body 1 communicating with the outer air after the air strangler is closed so as to maintain the high proportion of the fuel and the air when the engine is working and enable the engine to have a good starting performance.

Preferably, an arc recess 5100 is formed at the upper position 510 of the linkage arm 51, and the swing frame 21 has a column 210 corresponding to the arc recess 5100 formed thereon. The linkage arm 51 can be held when being rotated to the upper position 510 through the cooperation of the column 210 of the swing frame 21 and the arc recess 5100 at the upper position 510 of the linkage arm 51, which can prevent the handle 55 from repositioning due to the spring element 54, with no outer force transformed thereto such that the engine can keep a high mixing proportion of the fuel and the air when being started.

Figure 1:
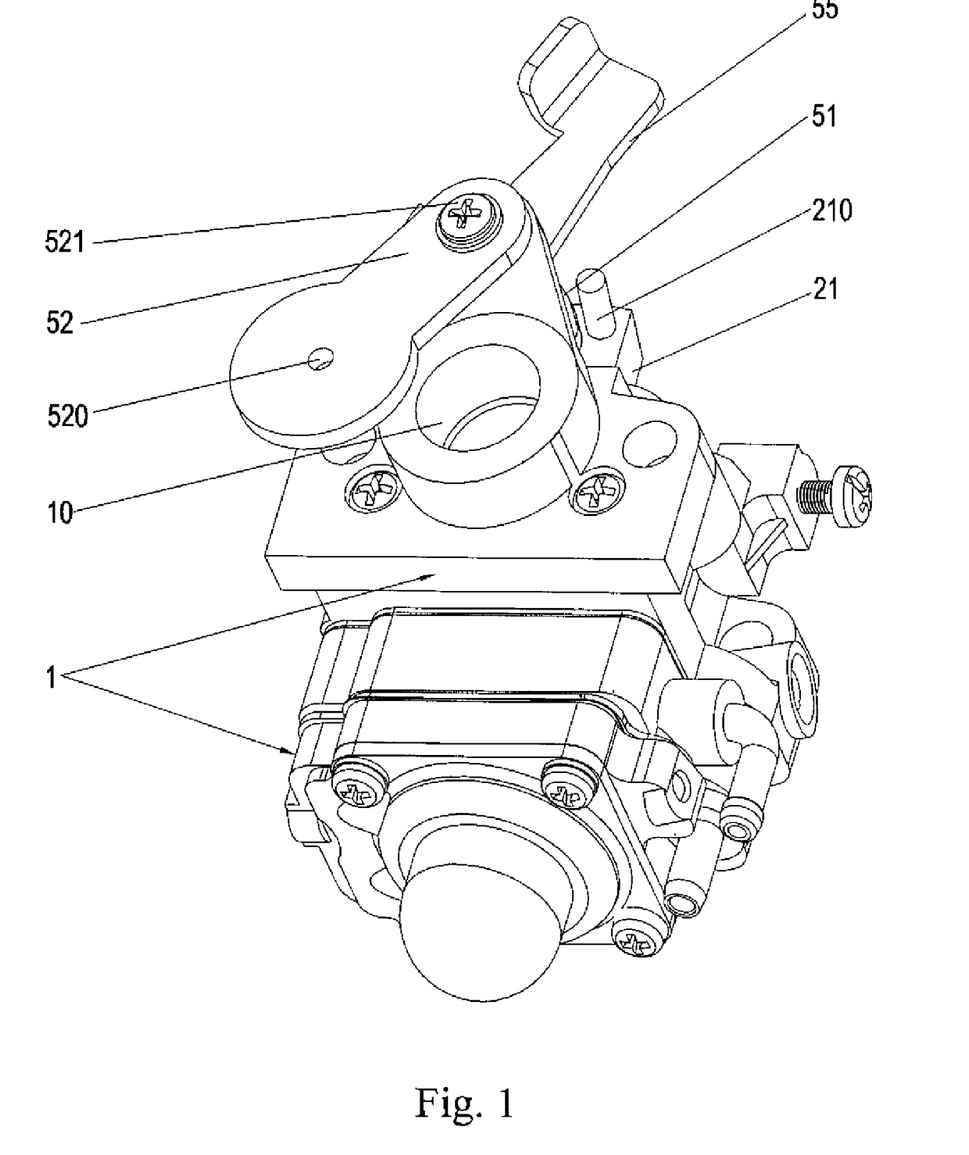
FIG. 1 is a perspective view illustrating a carburetor with a starter according to one embodiment of the present invention at a first state.
Figure 2:
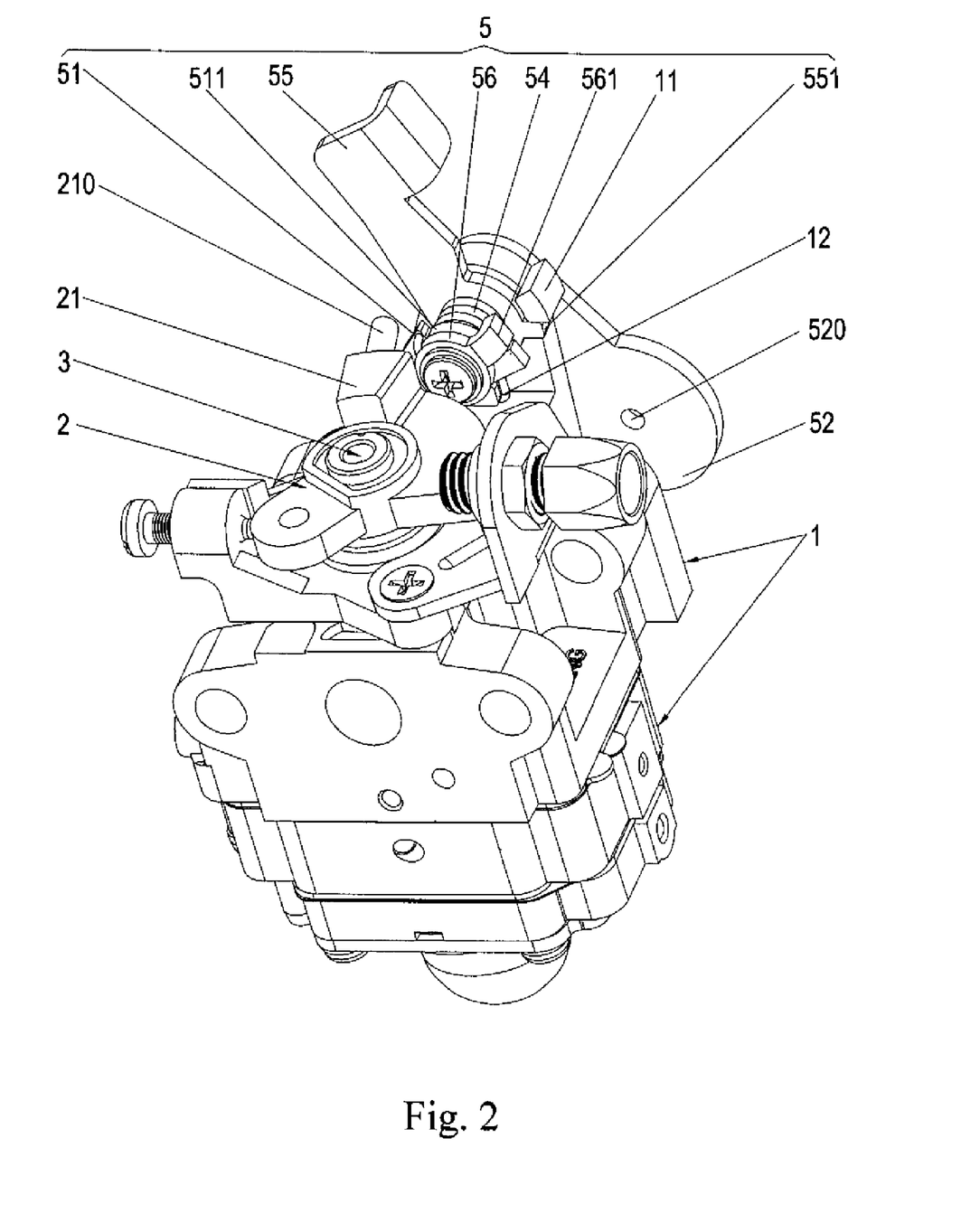
FIG. 2 is another perspective view illustrating the carburetor shown in FIG. 1 at the first state.
Figure 3:
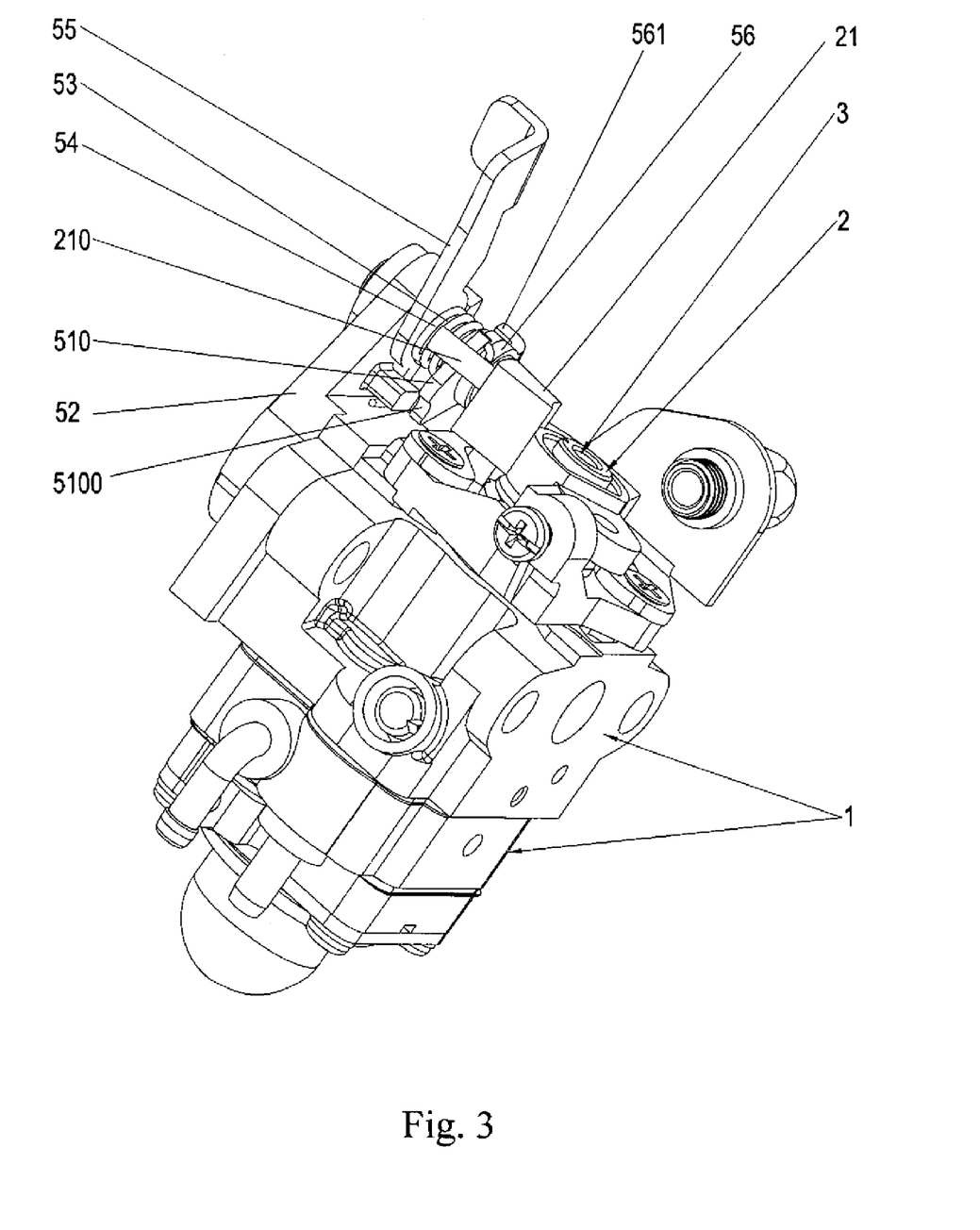
FIG. 3 is still another perspective view illustrating the carburetor shown in FIG. 1 at the first state.
Figure 4:
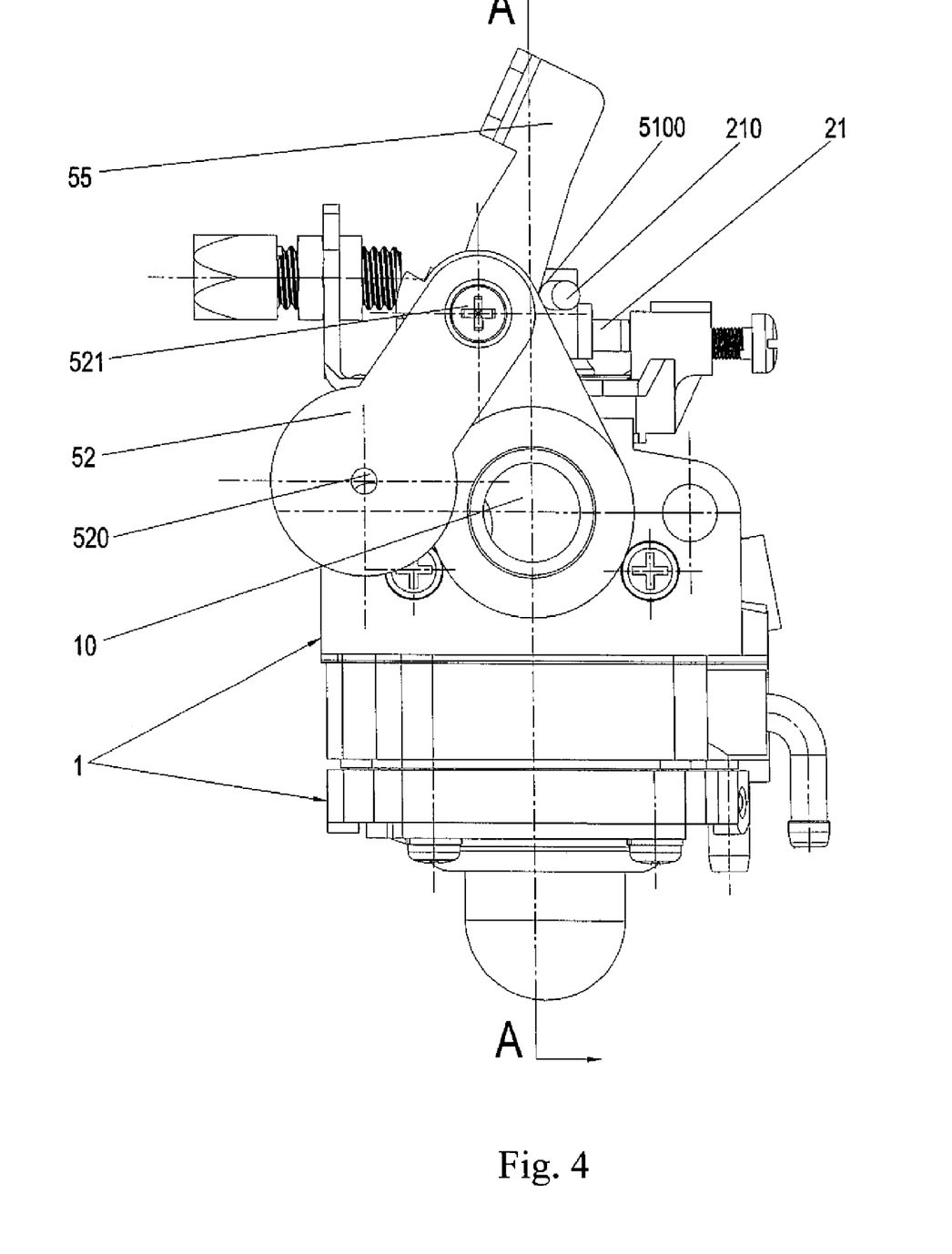
FIG. 4 is a side view of the carburetor shown in FIG. 1 at the first state.
Figure 6:
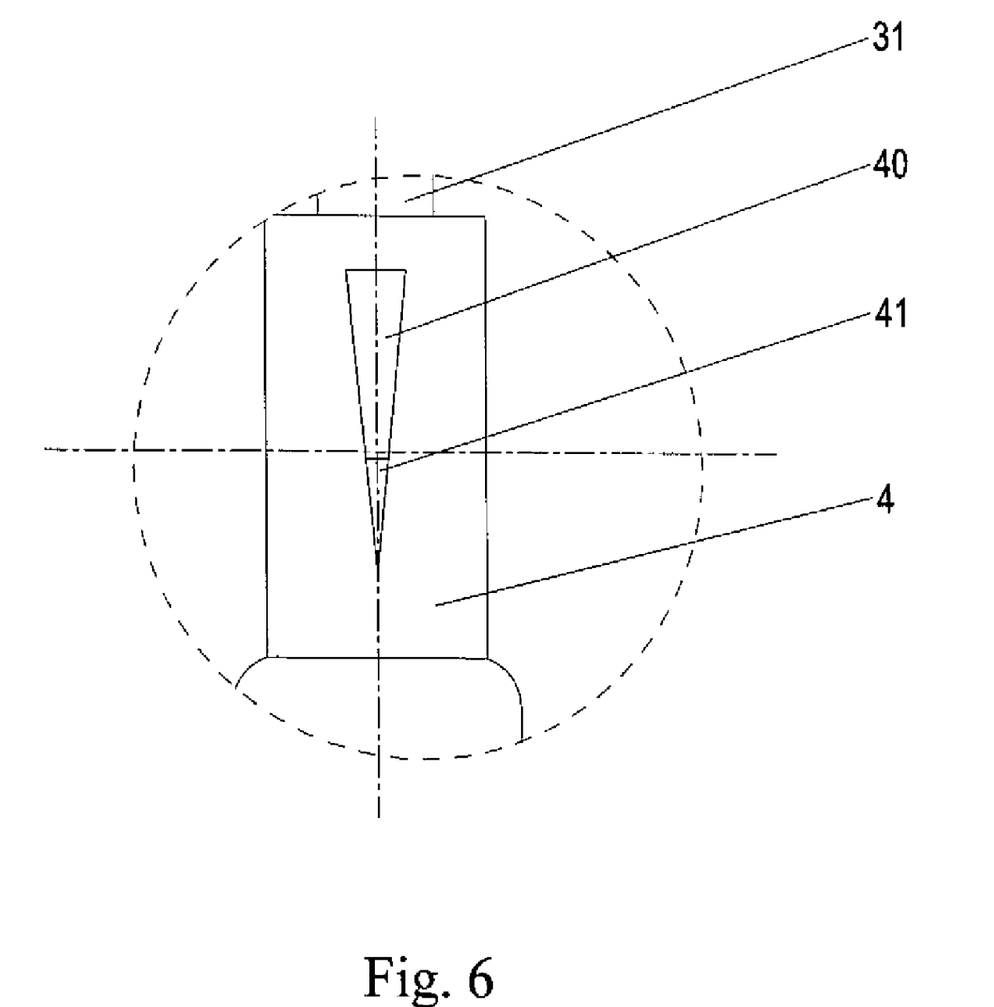
FIG. 6 is an enlarged view of a portion denoted by G shown in FIG. 5.
Figure 7:
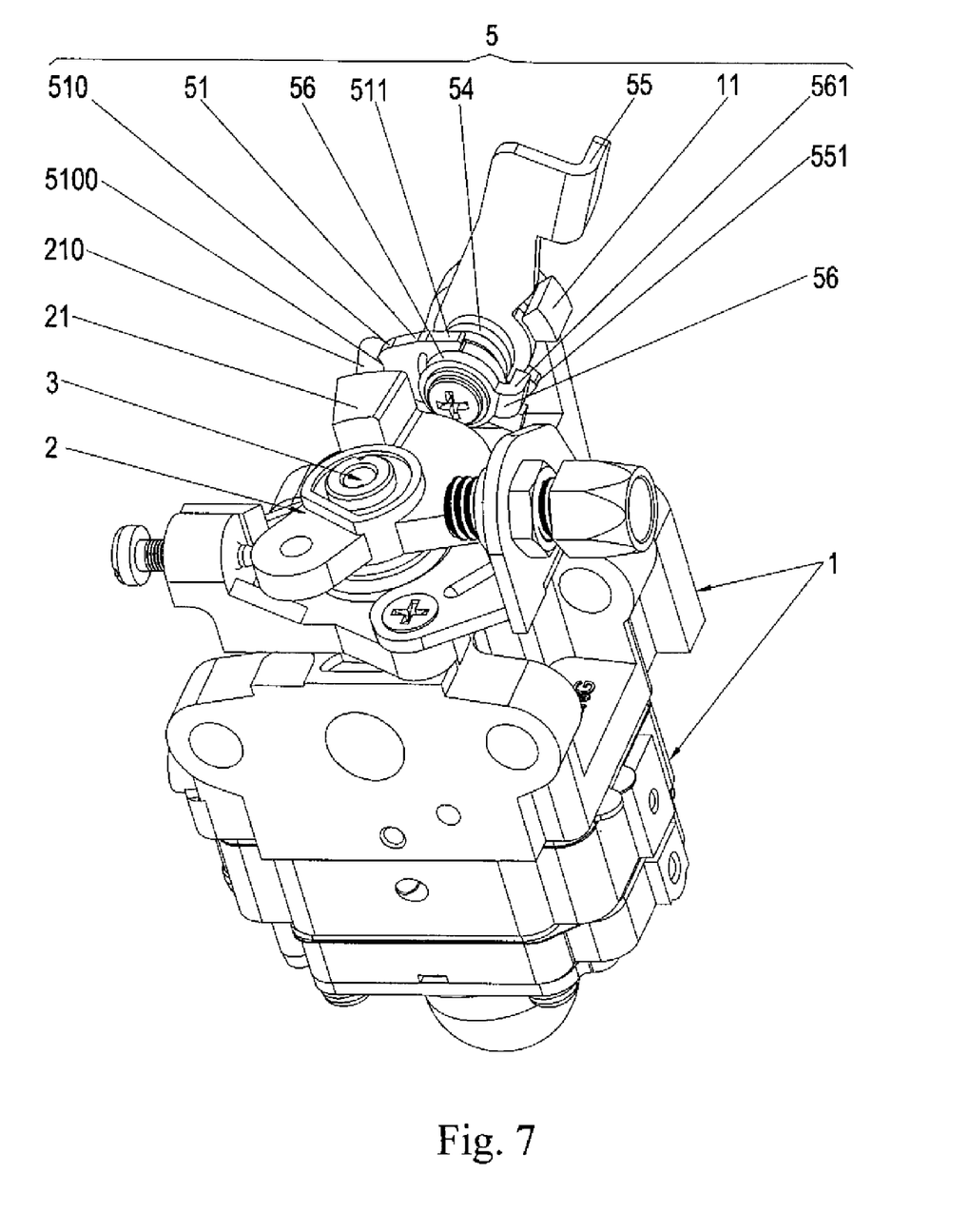
FIG. 7 is a perspective view illustrating the carburetor shown in FIG. 1 at a second state.
Figure 8:
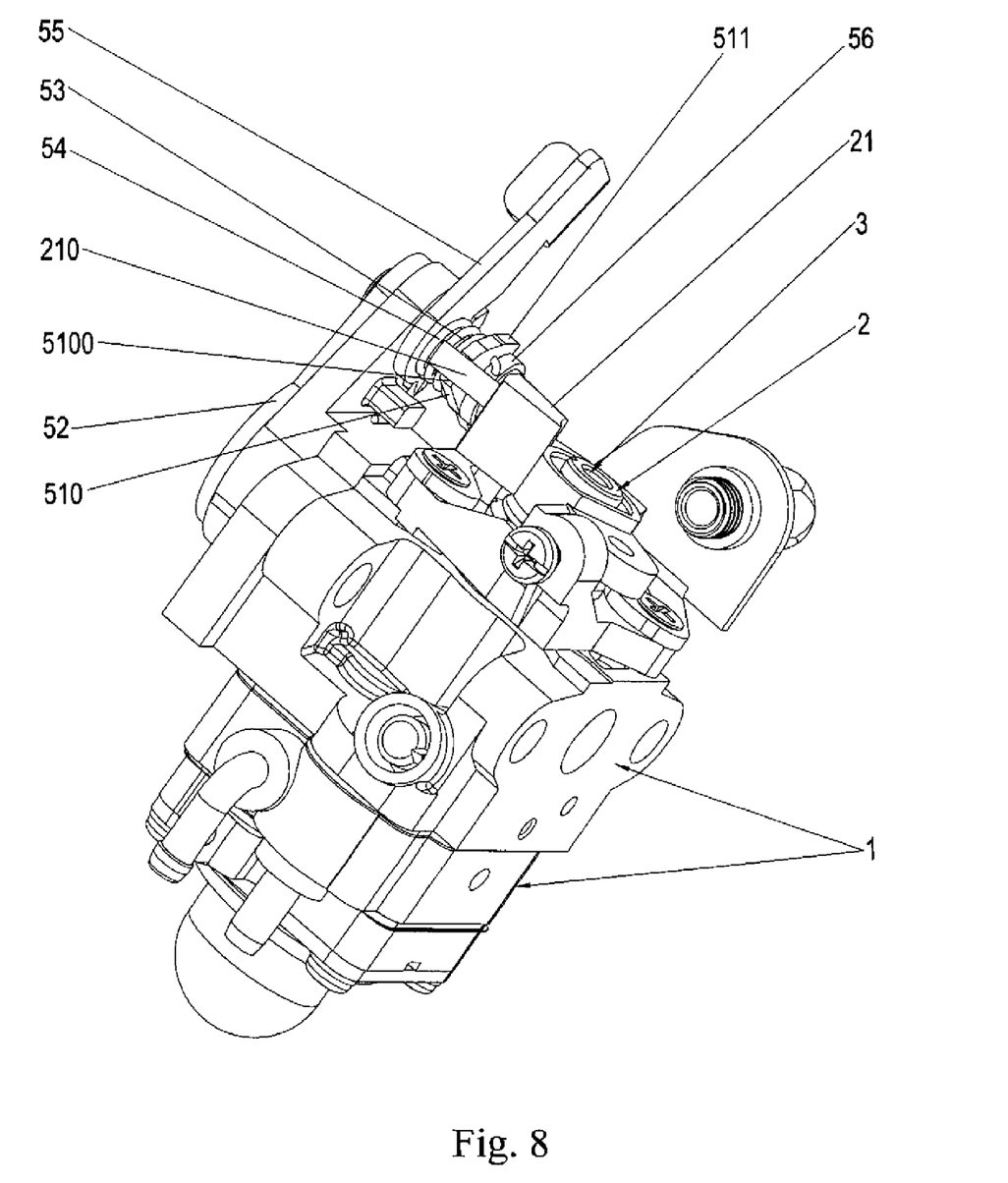
FIG. 8 is another perspective view illustrating the carburetor shown in FIG. 7 at the second state.
Figure 9:
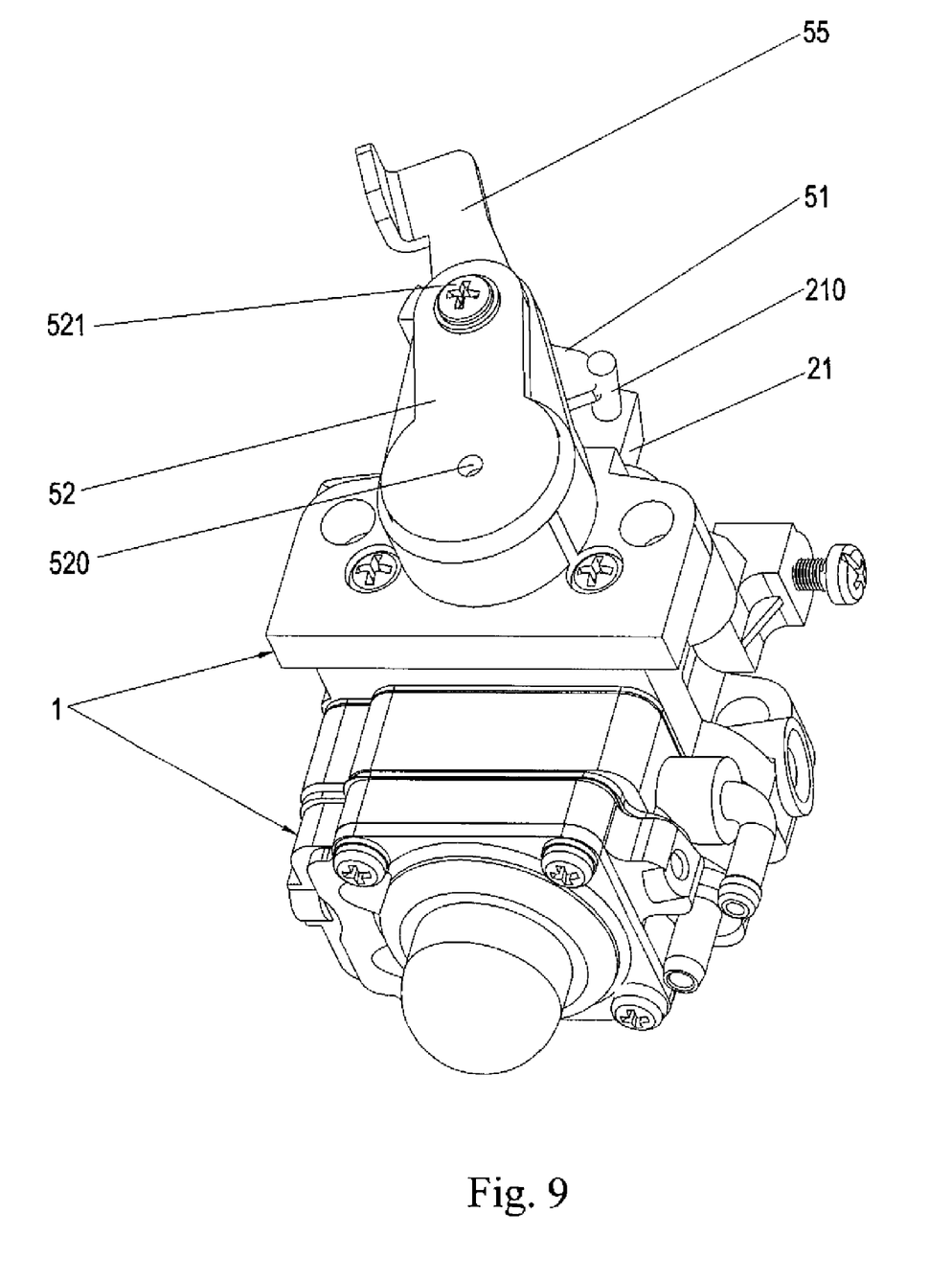
FIG. 9 is still another perspective view illustrating the carburetor shown in FIG. 7 at the second state.
Figure 10:
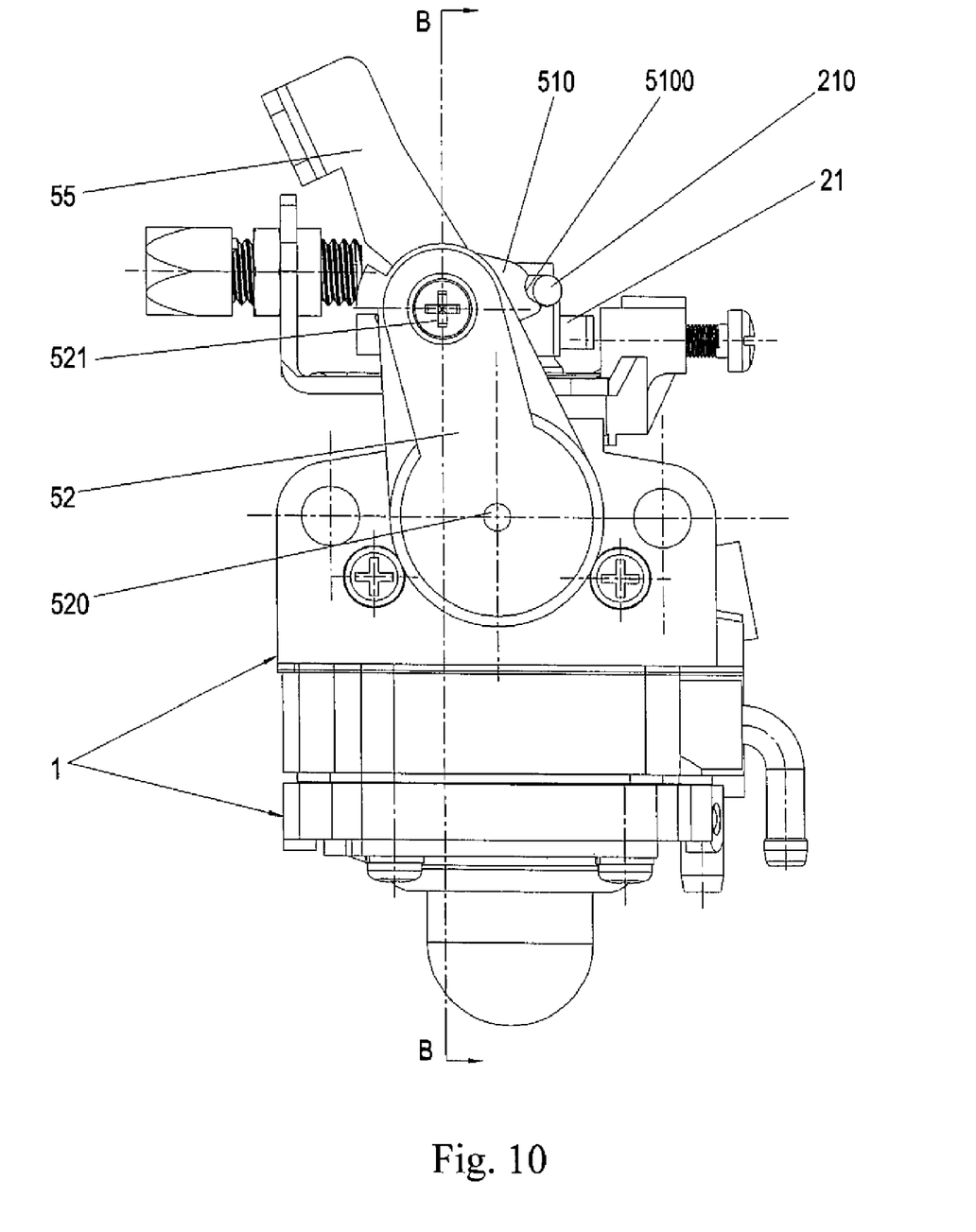
FIG. 10 is a side view of the carburetor shown in FIG. 7 at the second state.
Figure 12:
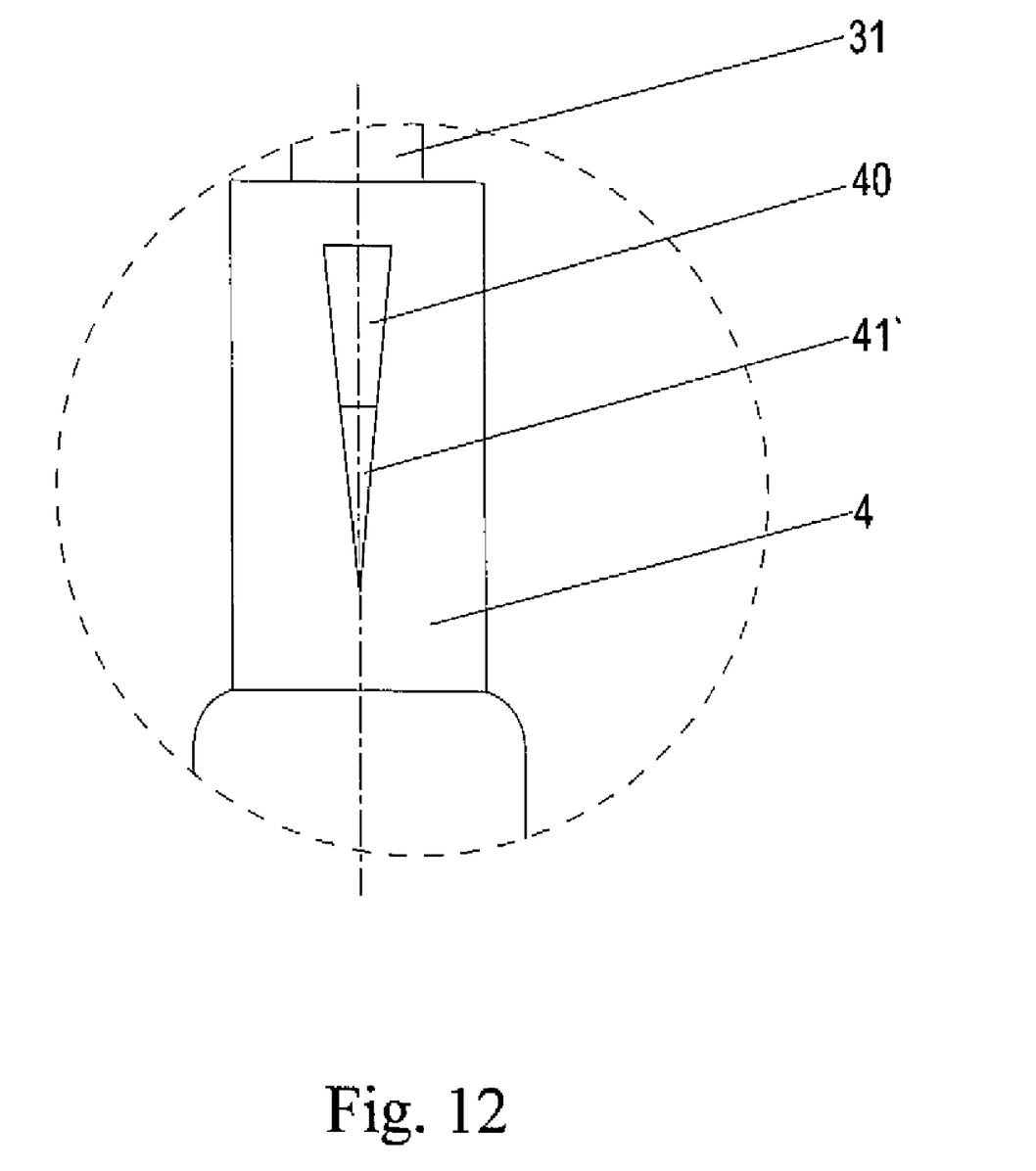
FIG. 12 is an enlarged view of a portion denoted by H shown in FIG. 11.

In conjunction with the drawings, the work principle of the carburetor with the starter of the present invention will be illustrated in detail. Before the engine starts, the carburetor with the starter is at a first state. At the first state, the main metering pin 31 of the idle speed fuel supply device 3 and the fuel nozzle 40 of the main nozzle 4 constitute a fuel injector as denoted by 41 in FIG. 5 and FIG. 6. Meanwhile, the air strangler 52 is opened, as shown in FIG. 1. Then, the handle 55 is rotated about the air strangler pivot 53 to drive the rocker 56, the linkage 51 and the air strangler 52 which are mounted on the air strangler pivot 53 to rotate. When contacting with the swing frame 21 of the main fuel supply device 2, the linkage arm 51 begins to push the swing frame 21 to rotate around a plunger pivot mounted on the plunger 22. Since the main metering pin cover 32 is fixed with the plunger 22, it rotates along with the plunger 22. And the main metering pin 31 can be moved up and down in the main nozzle 4 when the main metering pin cover 32 is rotated, for the main metering pin 31 and the main metering pin cover 32 is engaged with each other through the rolling male thread 310 and the rolling female thread 320, and one end of the main metering pin 31 cooperates with the main nozzle 4. In the meantime, the air strangler 52 is rotated to close the air passage 10 in the carburetor body 1. When the arc recess 5100 at the upper position 510 of the linkage arm 51 is engaged with the column 21 of the swing frame 21, the air strangler 52 closes the air passage 10 in the carburetor body 1, as shown in FIG. 9. The main metering pin 31 of the idle speed fuel supply device 3 and the fuel nozzle 40 of the main nozzle 4 forms a fuel injector at a second state, as denoted by 41' in FIG. 11 and FIG. 12. When the fuel nozzle is changed to the second state from the first state, the opening of the fuel nozzle is increased as well as the fuel output. Synchronously, the air input is decreased, so the mixing proportion of the fuel and the air is increased in preparation for the starting of the engine. After the engine is successfully started, it can be chosen to keep the carburetor working with a high mixing proportion of the fuel and the air, which is a hot machine state, or have the carburetor working at a normal state. When the carburetor works at a normal state, the swing frame 21 is rotated to drive the linkage arm 51 to quickly break away from the block portion of the swing frame 21 such that the linkage arm 51, the air strangler 52 mounted on the air strangler pivot 53 is repositioned quickly. On the one hand the air passage 10 of the carburetor body 1 is opened through the air strangler 52, and on the other the main metering pin 31 returns to the state shown in FIG. 5, such that the carburetor may work with an optimal mixing proportion of the fuel and the air to bring the engine into full play.

The carburetor with the starter according to the embodiments of the present invention makes use of the linkage arm 51 with the upper position 510 and the lower position 511, and the air strangler 52 so as to enable the metering pin 31 of the idle speed fuel supply device 3 provided on the main fuel supply device 2 moving in the idle speed fuel supply device 3 up and down to change the fuel output and enable the air passage 10 of the carburetor body 1 being closed, which can increase the mixing proportion of the fuel and the air and, in turn, increase the probability of the successful start of the engine, and keep the optimal mixing. proportion of the fuel and the air matching with the technique of the engine after the successful start, such that the engine can be brought into fill play. In addition, this structure not only avoids using a screwdriver to adjust the mix proportion of the fuel and the air after a successful start, but also avoids decreasing the performance of the engine and wasting fuel caused by that the optimal mixing proportion of the fuel and the air in the carburetor can not return accurately, which may shorten the useful life of the engine.

It is noted that the shape of the carburetor body 1, the components of the starter, the main fuel supply device 2 and the idle fuel supply device 3 is well known to one of the ordinary skill in the art, so it is omitted hereafter.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A carburetor with a starter comprising:
   a carburetor body;
   a main fuel supply device with a swing frame;
   an idle speed fuel supply device with a main metering pin;
   a starter;
   a joint for a fuel input pipe; and
   a main nozzle having a fuel nozzle,
   the idle speed fuel supply device being mounted on the main fuel supply device and connected with the main nozzle to constitute a fuel injector, the main fuel supply device, the joint for a fuel input pipe and the main nozzle being respectively mounted on the carburetor body;

wherein the carburetor further comprises an operating mechanism having a linkage arm and an air strangler, the linkage arm has an upper position and a lower position, when the upper position presses against the swing frame, the main metering pin is moved and the air strangler closes an air passage in the carburetor body.

2. The carburetor as claimed in claim 1, wherein the air strangler is pivoted to one side of the carburetor body, and the linkage arm is pivoted to the other side of the carburetor body.

3. The carburetor as claimed in claim 1, wherein the main metering pin has a rolling male thread, and a main metering pin cover of the idle speed fuel supply device has a rolling female thread formed therein engaged with the rolling male thread.

4. The carburetor as claimed in claim 3, wherein a main metering pin pressure spring is disposed between the main metering pin and the main metering pin cover with one end thereof pressed against the main metering pin and the other end pressed against the main metering pin cover.

5. The carburetor as claimed in claim 1, wherein the operating mechanism further comprises an air strangler pivot, a spring element, a handle, and a rocker, the air strangler pivot runs through the carburetor body, one end of which is fixed with the air strangler and the other end of which is fixed with the rocker and the linkage arm respectively, the handle is fixed on the air strangler pivot and located between the linkage arm and the air strangler, the spring element is sleeved on the air strangler pivot with two ends thereof respectively pressed against the carburetor body and the linkage arm.

6. The carburetor as claimed in claim 5, wherein the handle has a handle lug formed thereon, the rocker has a rocker protrusion formed thereon, and the carburetor body has a carburetor body lug and a carburetor body protrusion, respectively corresponding to the handle lug and the rocker protrusion formed thereon.

7. The carburetor as claimed in claim 1, wherein the air strangler has a blowhole formed therein.

8. The carburetor as claimed in claim 1, wherein the linkage arm has an arc recess formed at the upper position thereof, and the swing frame has a column corresponding to the arc recess formed thereon.

* * * * *